US007433675B2

(12) United States Patent
Lucidarme et al.

(10) Patent No.: US 7,433,675 B2
(45) Date of Patent: Oct. 7, 2008

(54) COMMUNICATION SYSTEM AND RELATED SUPERVISION METHOD

(75) Inventors: Thierry Lucidarme, Montigny-le-Bretonneux (FR); Pierre Lescuyer, Montigny-le-Bretonneux (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 94 days.

(21) Appl. No.: 10/509,397

(22) PCT Filed: Mar. 20, 2003

(86) PCT No.: PCT/FR03/00891

§ 371 (c)(1),
(2), (4) Date: Sep. 24, 2004

(87) PCT Pub. No.: WO03/081928

PCT Pub. Date: Oct. 2, 2003

(65) Prior Publication Data

US 2005/0170809 A1    Aug. 4, 2005

(30) Foreign Application Priority Data

Mar. 25, 2002  (FR) .................................. 02 03696

(51) Int. Cl.
*H04M 11/00*  (2006.01)
(52) U.S. Cl. ..................................................... 455/406
(58) Field of Classification Search ................. 455/406, 455/405, 550, 432.1, 434, 435.1, 452.2, 408, 455/456.2, 456.3, 410, 411, 461, 550.1
See application file for complete search history.

(56) References Cited

U.S. PATENT DOCUMENTS

| 6,564,047 | B1 * | 5/2003 | Steele et al. ................. 455/405 |
| 6,603,977 | B1 * | 8/2003 | Walsh et al. ............. 455/456.1 |
| 6,714,778 | B2 * | 3/2004 | Nykanen et al. ......... 455/414.1 |
| 6,816,724 | B1 * | 11/2004 | Asikainen ................ 455/414.1 |
| 6,879,835 | B2 * | 4/2005 | Greene et al. ............ 455/456.1 |
| 2002/0013150 | A1 | 1/2002 | McKenna et al. |
| 2002/0193107 | A1 * | 12/2002 | Nascimento, Jr. ........... 455/426 |
| 2003/0054796 | A1 * | 3/2003 | Tamaki et al. ............... 455/406 |

FOREIGN PATENT DOCUMENTS

EP    0 971 525    1/2000

OTHER PUBLICATIONS

Internet Engineering Task Force, "Network Working Group Request for Comments (RFC)1661 / The Point-to Point Protocol (PPP)," Jul. 1994, 50 pgs.

(Continued)

*Primary Examiner*—Naghmeh Mehrpour
(74) *Attorney, Agent, or Firm*—Trop, Pruner & Hu, P.C.

(57) ABSTRACT

The invention concerns a communication system comprising a radio unit, several terminal facilities and a local administration server. The radio unit comprises a first communication interface with the terminal facilities, a second radio communication interface with a cellular network, a module for identifying a subscription to the cellular network and device for handover of multiple user streams between the cellular network and the respective terminal facilities connected to the first interface when the subscription is identified by said module. The local administration server comprises device for communication with the terminal facilities, independent of the cellular network, to supervise the exchanges over the first communication interface.

37 Claims, 3 Drawing Sheets

OTHER PUBLICATIONS

3GPP, Universal Mobile Telecommunications System (UTMS); Report on Terminal Interfaces—An Overview, TR 27.901, version 3.0.0, Jan. 2000, 10 pgs.

3GPP, Universal Mobile Telecommunications System (UTMS); Multicall; Service description; Stage 1, TS 22.135, version 4.0.0, Mar. 2000, 20 pgs.

3GPP, Digital cellular telecommunications system (Phase 2+) (GSM); Universal Mobile Telecommunications System (UTMS); Mobile Station (MS) supporting Packet Switched Services, TS 27.060, version 3.5.0, Mar. 2001, 29 pgs.

IEEE (Institute of Electrical and Electronics Engineers), IEEE Standards for Local and Metropolitan Area Networks: Overview and Architecture, Standard 802-1990, Section 5, Dec. 31, 1990, 31 pgs.

* cited by examiner

COMMUNICATION SYSTEM AND RELATED SUPERVISION METHOD

BACKGROUND OF THE INVENTION

The present invention relates to a communication system comprising a distributed terminal designed to offer services to a number of users based on a single subscription to a mobile radio network, and a method for supervising communication that can be used in such a system.

Distributed mobile radio terminals are known. Such a terminal model has been adopted by the 3GPP organization (see technical report 3G TR 27.901, version 3.0.0, Jan. 2000). In particular, the GPRS (General Packet Radio Service) technology, which is an extension of the GSM (Global System for Mobile communications) system standardized by the ETSI (European Telecommunications Standards Institute), can be used to separate two entities within a terminal:

- a mobile termination, or MT, which is responsible for radio transmission and reception with respect to the GPRS network according to a conventional GSM-type air interface, and
- a terminal equipment, or TE, which incorporates the highest level protocol layers, typically from the transport layer to the application layer, based on a layered OSI (Open System Interconnect) representation model.

The communication between the MT and the TE is normally conducted via a non-specific point-to-point or point-to-multipoint link. Thus, a terminal equipped with GPRS technology can interchange data with a GPRS network which may be interconnected with a network containing application servers, by exploiting the application and presentation capabilities of the TE and the radio transmission offered by the MT.

By way of illustration of this technology and its applications, it is worth remembering that numerous mobile phones currently incorporate a modem and have a port which can be used to connect them to a peripheral device, such as a personal digital assistant. In this case, a person having taken out a subscription with an operator having a mobile radio network can use his or her personal assistant as terminal equipment (TE), for example to consult an Internet data site, whereas the mobile phone (MT in this case) will act as a relay for the Internet protocol (IP) data for which it will adapt the format for interchanging the data, over a radio channel, with the mobile radio network, itself connected to the Internet in this example.

The UMTS (Universal Mobile Telecommunication System) technology, standardized by the 3GPP, can be used to obtain the same separation between MT and TE. A UMTS distributed terminal can therefore in the same way interchange data with a UMTS network.

Moreover, there are mobile radio terminals that can support several simultaneous communications.

The abovementioned GPRS system can be used to open, for the same user, a number of communication sessions, called PDP (Packet Data Protocol) contexts, for the purpose of packet mode data interchanges with the network. Because of this functionality, a user can theoretically surf the Internet in WAP (Wireless Application Protocol) mode on his or her GPRS mobile phone and access a website on his or her computer connected to his or her mobile phone, via the activation of two PDP contexts.

The UMTS system provides the same capability and in addition has a multicall functionality enabling a plurality of speech calls to be set up, for a particular user, using a circuit mode transmission, each speech call being carried by a dedicated radio channel. A general description of this function can be found in the technical specification TS 22.135, version 4.0.0, published by the 3GPP in Mar. 2000. Such multicall systems are described for example in US-A-2002/013150 and EP-A-0 971 525.

However, the use of a distributed terminal as described previously is linked to the concept of mobile radio network subscriber, because a user must have a subscription from which the network operator manages his or her profile and his or her calls (service access, call characteristics, usage billing, etc.). The subscription with the operator is in practice embodied, in a GSM or UMTS type cellular system, by a subscriber identity module (SIM) belonging to the MT. If two people want to use the services offered by a mobile operator, for example using two TEs linked to the same MT, the network operator can no longer distinguish between the two users.

An object of the present invention is to allow independent supervision of the various users of a mobile radio network, in a shared network subscription model.

Another object of the present invention is to allow an independent use of the services offered by a mobile operator for different users from a shared network subscription.

SUMMARY OF THE INVENTION

The invention thus proposes a communication system comprising a radio unit, several terminal equipments and a local administration server. The radio unit comprises a first communication interface with the terminal equipments, a second radiocommunication interface with a cellular network, a module for identifying a subscription to the cellular network. and means for transferring multiple user streams between the cellular network and the respective terminal equipments connected to the first interface within the framework of the subscription identified by said module. The local administration server comprises means of communication with the terminal equipments, independent of the cellular network, to supervise the interchanges over the first communication interface.

The multiple user streams between the terminal equipments and the cellular network can be successive or simultaneous and can be conveyed as required either in packet mode, for data transmissions for example, or in circuit mode, for speech calls for example.

The communications between the terminal equipments and the radio unit (acting as an MT) can be based on different interfaces or even just one type of interface with a common protocol, radio for example. In the latter case, any interchanges between the radio unit and the local administration server can preferably be conducted using the same type of interface.

Activity measurements to ascertain the effective usage of each user of a terminal equipment can be taken on the radio unit or preferably on each terminal equipment. They can then be used as a basis for billing the users based on the communications between the terminal equipments and the local administration server. This enables the radio unit holder or manager to offer customers a cellular network access service without needing any particular coordination with the operator of that network: all that is needed is to take out a subscription.

The supervision conducted by the local administration server can also cover the functions of terminal equipment authentication and local encryption of calls between MT and TEs.

According to another aspect, the invention proposes a supervision method in a communication system comprising a radio unit, several terminal equipments and a local administration server. The radio unit comprises a first communication interface with the terminal equipments, a second radiocommunication interface with a cellular network, a module for identifying a subscription to the cellular network and means for transferring multiple user streams between the cellular network and the respective terminal equipments connected to the first interface within the framework of the subscription identified by said module. The local administration server communicates with the terminal equipments, independently of the cellular network, to supervise the interchanges over the first communication interface.

The invention is well suited to a variety of applications based on various economic models.

For example, the invention can allow a public transport company to acquire a distributed terminal, while taking out a subscription to a mobile operator, and a local administration server. It is also possible to envisage the local administration server being incorporated in the same equipment as the radio unit of the distributed terminal. The radio unit is located in the transport means (bus, train, boat, tourist coach, etc.). Preferably, the transmit and receive radio antennas of this module are located outside the transport means in order to achieve a maximum transmit and receive mode gain, significantly greater in particular than that which would be achieved by a user of a conventional terminal confined inside the transport means. The terminal equipments, for their part, are distributed to the passengers who want them. Each can then use the services of interest to them on their own part of the distributed terminal, independently of the usage made of them by the other passengers. All the calls, however, pass through the radio unit. Each user can then be offered a billing according to his or her consumption. This step can be implemented simply by paying a bill printed out by the manager of the transport means. In another embodiment, each user can be given, together with his or her terminal equipment, a payment card containing a prepaid credit which is consumed as the terminal is used, until all of the credit is used up. The price of such a service can be considered to be less than that required for a "conventional" terminal with a conventional subscription, since the transport company, in this example, can offer a service to several users with a single subscription and can additionally perhaps negotiate scales of charges (flat rate, etc.) to be paid as appropriate to the mobile operator providing his or her mobile radio network and the related services.

In another exemplary application, three people located in the same space can simultaneously, and using the same subscription, respectively browse the web on a computer, make a speech call on a mobile phone and send emails from a personal digital assistant, provided that these three terminal equipments cooperate, in accordance with the invention, with a single radio unit. Each has a dedicated access to the required service with service characteristics dependent on the terminal equipment used and the service required (for example, activation of encryption for the user sending emails). Each can also have details of his or her personal consumption, which can be used as a basis for producing a statistical consumption profile, typically giving information on the average consumption of the users, the most used services, and so on.

DESCRIPTION OF PREFERRED EMBODIMENTS

Figure 1:
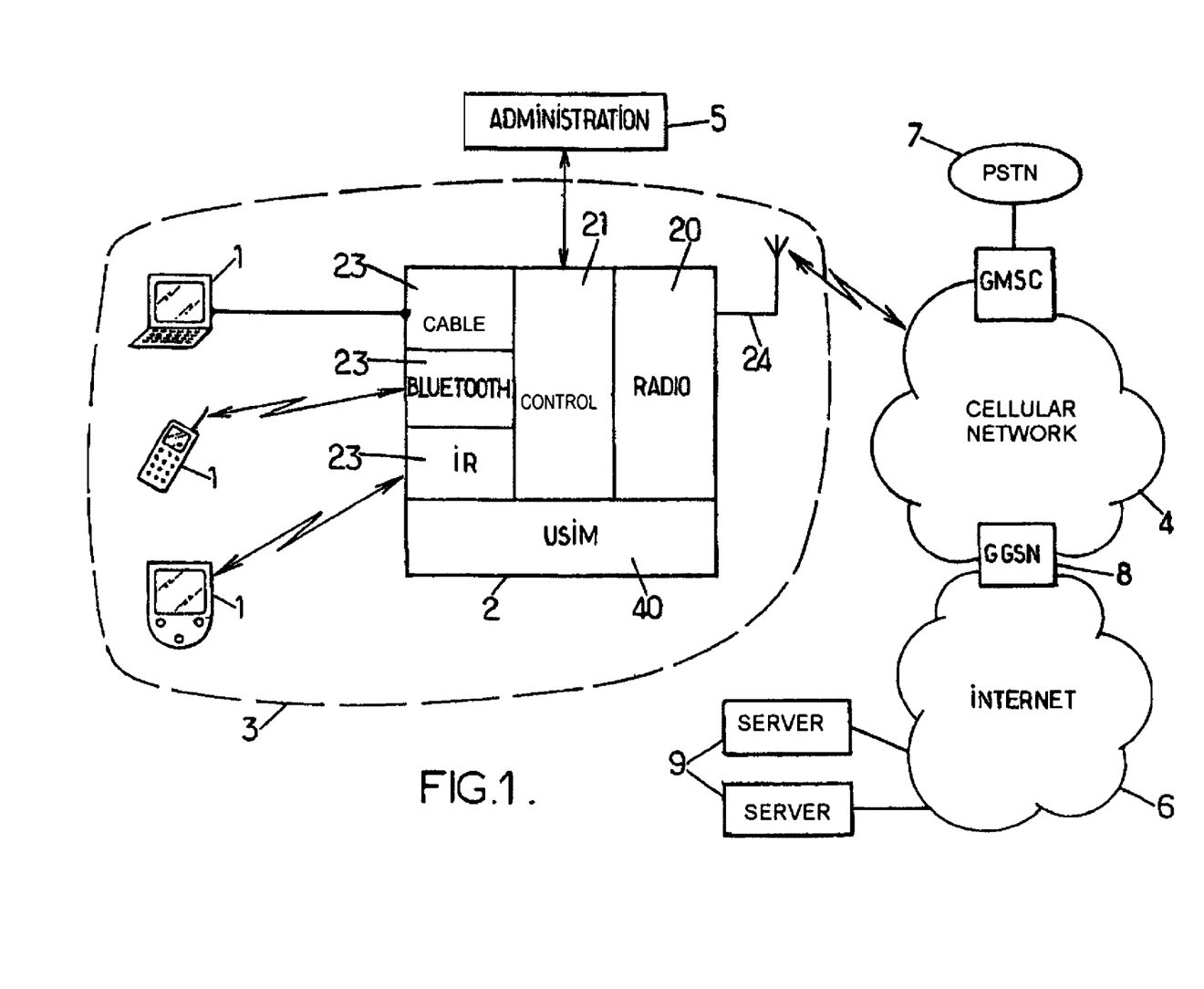
FIGS. 1 and 2 are simplified diagrams of two examples of systems according to the invention.

The distributed terminal 3 represented in FIG. 1 is made up of two types of elements. The first concerns terminal equipments 1 (TE). There are at least two of these equipments and they can appear in different forms. For example, a first TE is a computer, a second a mobile phone, and a third a personal digital assistant. The second type of element is a radio unit 2 corresponding to a mobile termination MT.

A number of interfaces are involved. This is in particular the case between the elements 1 and 2 of the distributed terminal 3, between which any type of layer 1 interface can be envisaged. A technical report TR 27.901, version 3.0.0, published in Jan. 2001 by the 3GPP standardization organization, gives recommendations of use for the interface between an MT and a TE and potential examples of interfaces. Three examples have been considered for the three TEs 1 represented in FIG. 1: a serial cable connecting the computer in the figure to the radio unit 2, an infrared link linking the personal digital assistant represented and the radio unit 2, a Bluetooth wireless technology as represented between the mobile phone in FIG. 1 and the MT. This technology is advantageous because it has the benefit of offering freedom of movement and a degree of autonomy for the user of a TE 1 with respect to the MT 2 which may if necessary be fixed, in as much as that technology is based on a connection by radio channel. Thus, each TE has at least a means of connection to the MT 2 according to a given technology.

For each layer 1 technology considered, the MT 2 comprises an interface module 23 for communicating with the TEs 1. The MT 2 also has a radio interface 20 and at least one antenna 24 via which the information streams from or to a cellular mobile radio network 4 are sent and received.

The cellular network 4 is connected to other networks, for example the Internet 6 or the public switched telephone network (PSTN) 7. The radio interface 20 used is a standardized air interface according to a known system, typically of GSM or UMTS type, involving a base station subsystem for communicating by radio with the terminals and switches routing the traffic and the signaling within the mobile radio network. These switches comprise mobile switching centers (MSC) for the circuit mode and GPRS support nodes (GSN) for the packet mode. Some of the MSCs, called GMSC (gateway MSC), serve as a gateway with external circuit switched networks, such as the PSTN 7. Some of the GSNs, called GGSN (gateway GSN), serve as a gateway with external packet switched networks, such as the Internet 6. A last interface is represented in FIGS. 1 and 2: it is the interface that links the MT 2 and the local administration server 5 which is detailed below.

Figure 2:
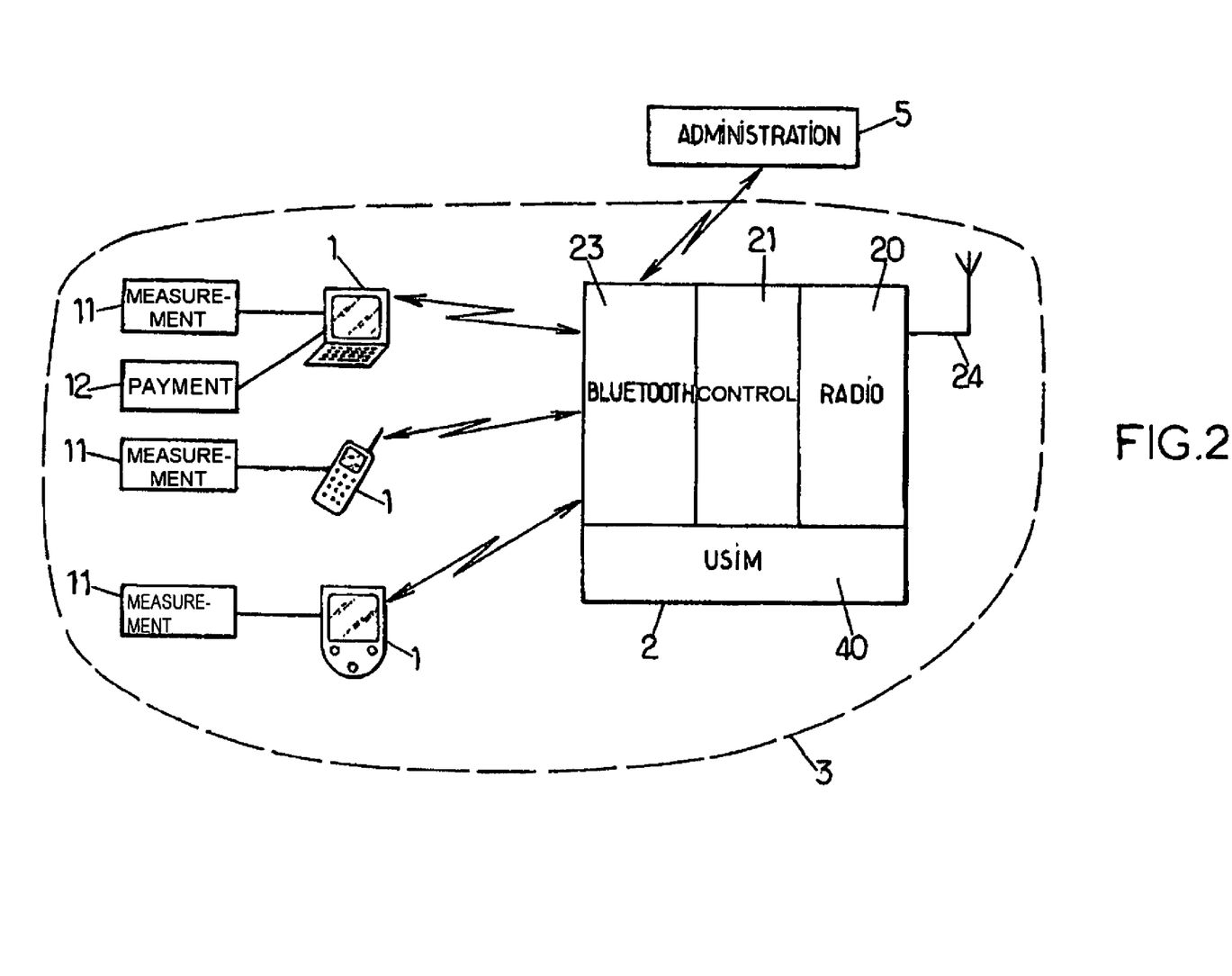

In the embodiment illustrated by FIG. 2, the MT 2 is equipped with a single Bluetooth type interface 23 for point-to-multipoint mode communication with the various TEs 1. The distributed terminal 3 then uses a sort of local radio network.

Figure 3:
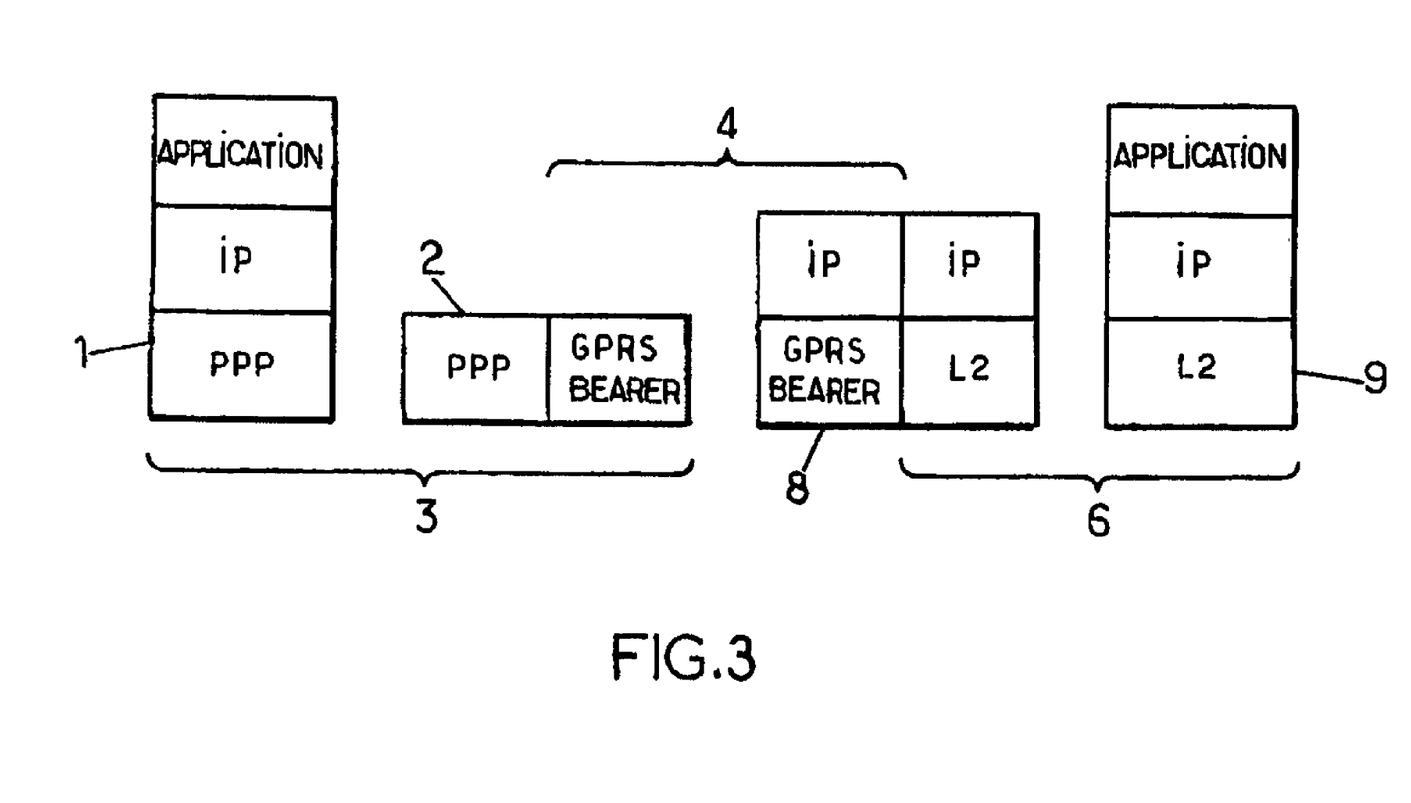
FIG. 3 is an illustration of protocols used according to an embodiment of the invention.

FIG. 3 diagrammatically represents protocols used on the various interfaces. At this stage, the protocols are illustrated for the case of a terminal 3 comprising a single TE 1. It can be seen that the modules TE 1 and MT 2 communicate using a layer 2 protocol. In a typical embodiment, a point-to-point type protocol (PPP) is used between the elements 1 and 2 of the distributed terminal 3. This protocol is in fact a suite of protocols and has been standardized by the IETF (Internet Engineering Task Force) organization in document RFC 1661 published in Jul. 1994. Since this protocol is independent of the physical layer used, it represents an effective solution for information interchanges between all types of TE and the radio unit MT 2. However, any other type of data link protocol can be considered for the calls between TE and MT.

The TEs 1 also have higher protocol layers. For example, in FIG. 3, the TE 1 has an IP (Internet Protocol) type network layer. Above this network layer, there can be various transport or application layers, dependent on the services concerned. Other protocol layers are of course possible, in particular at the transport, presentation and application levels of the OSI model. Technical specification TS 27.060, version 3.5.0, published in March 2001 by the 3GPP organization, explains, in its section 9, a communication model identical to that used in this example and describes the mapping of the IP layer present in the TE to the PPP layer present in the TE and the MT, in particular for the configuration functions culminating in the activation of a PDP context.

The cellular network 4 comprises a radio part including the base stations, with the protocol layers provided by the standardized air interfaces for the technology used, and a core network including the MSCs and GSNs. The calls between the MT 2 and the GGSN 8 of the network 4 are based, in the example of FIG. 3, on a GPRS-dedicated protocol, known per se. In this case, the radio interface 20 is that defined in the GSM system. However, other types of radio access can be used such as that of the UMTS system, for example.

The GGSN 8 acts as an IP router on interchanges between a TE 1 and an application server 9. This is the first router of the IP network seen from the TE. It will be noted that other IP routers (not shown) will typically be present between the GGSN 8 and the server 9.

If, for example, the TE 1 sends IP datagrams to an application server 9, it encapsulates them in the PPP protocol to transmit them to the radio unit 2. The latter modifies the format of PPP frames to adapt them to the packets used in GPRS. The packets are then sent by the module 2 to the telecommunication network 4 according to the GPRS protocol. A dedicated communication radio channel is used for this purpose to transmit the information from the radio unit 2 to the network 4. On receiving the data, the GGSN of the network 4 de-encapsulates the data and retrieves the IP datagrams sent by the TE module 1. These datagrams are then routed within the network 6 according to the IP protocol to the server 9. The latter is then able to receive the data transmitted by the TE 1 and, where appropriate, to return other data to it.

Let us now consider the case of several TEs 1 wanting to interchange information with the network 4. To remain within the illustrated GPRS example, two TEs 1 can each independently make a PDP context activation request. For this, the protocols represented in FIG. 3 still apply for each of the TEs 1 used. The radio unit 2 routes the requests to the GGSN which processes them in turn independently. Radio resources are then activated between the MT 2 and the network 4 comprising base stations not represented in FIG. 3 but designed to communicate with the module 2 and the GGSN. These radio resources are independent since they are dedicated to each of the TEs involved. Typically, a transport channel TCH will be activated to transport the data from a given TE. The TCHs dedicated to the various users are supported by different time slots, even by different frequencies.

Similarly, if we consider the UMTS system rather than the GPRS system, the channels used for the various TEs 1 can be defined by different spreading codes or even be multiplexed on a single code. In this sense, the activation of a number of PDP contexts is achieved in the same way as in the case where only one TE requires, for its own use, a number of PDP context activations, as summarized above.

According to the invention, the information interchanged for each of the PDP contexts is routed from or to the TE 1 concerned via the point-to-point link that links the radio unit MT 2 to each of the TE equipments 1. To this end, each TE 1 used has a specific identifier which enables the MT 2 to map the PDP contexts to the various TEs 1 in order, for example, to send the data intended for a TE only over the appropriate interface. For example, as is the case in FIG. 2 where a Bluetooth interface is used between the MT 2 and a TE 1, the latter have an OUI (organizationally Unique Identifier) address encoded on 48 bits, as defined in section 5 of the IEEE (Institute of Electrical and Electronics Engineers) standard 802-1990 published in 1990. The mapping can be performed by a control module 21 inside the MT 2. In another embodiment, the MT 2 sends the packets corresponding to a PDP context over all its interfaces 23 with the TEs 1. The packets contain an identifier specific to the PDP context. Each TE then receives the packets and takes them into account if they are implemented for a PDP context that concerns it. In the uplink direction, all of the packets transmitted by the TEs 1 are received by the MT 2 which then routes them indiscriminately toward the network.

The abovementioned control module 21 can also be used in implementing advanced functions for managing the traffic of the various TEs 1. Such a control module 21 can already be found in the known model of a terminal typically equipped with GPRS technology, and therefore capable of supporting a number of PDP context activations successively or simultaneously. The functions offered by this control module 21 are, for example, scheduling the setting up of the PDP contexts, where appropriate according to a queuing mechanism. This means that the PDP contexts will be activated according to an order predefined by the module 21 according to the time when the corresponding requests are received by this module. The queuing mechanism can, for example, be used, when a number of PDP contexts are already open, to avoid immediately rejecting a new PDP context activation request, and instead place it in the queue until the terminal concerned can deal with it.

The control module 21 can also handle priority management, in other words decide to activate or maintain one PDP context as opposed to another or in place of another, if it is required by a TE to which a predefined priority has been assigned that is greater than the user of the other PDP context.

Yet another example of functions handled by the control module 21 is a service quality management enabling the MT 2 to negotiate a service level with the network 4. This can be used to grant an appropriate service level according to the wishes of the user of a TE and what the network 4 is capable of effectively offering it for each PDP context. In the present invention where several TEs 1 are involved, the control module 21 operates in the same way as for the case of a single TE.

As was summarized in the introduction, another embodiment of the invention could be based on the use of a mobile radio network 4 according to the UMTS technology. In this case, a distributed terminal 3 according to the invention has, as in the case of the GPRS system, the capability of activating and maintaining a number of PDP contexts successively or simultaneously, but it can also, with the multicall function described above, activate and maintain several speech calls using a circuit mode transmission. Thus, each TE 1 can make a speech call independently of the other TEs; all of the speech calls being routed through the radio unit 2 supporting the UMTS radio technology.

The MT 2 is equipped with a single subscriber identification module 40 which can be a SIM (Subscriber Identity Module) card in the case of the GPRS or a USIM (Universal Subscriber Identity Module) card in the case of the UMTS. Several data or speech calls, in the UMTS context, are then routed successively or simultaneously for various TEs 1 while having a single subscription identification module 40 on the MT 2. However, the MT can also contain several SIM/USIM cards. In the latter case, the MT 2 manages the two subscriptions in a juxtaposed and independent manner. The benefit of multiplying the subscriptions in the MT 2, or even of juxtaposing several MTs 2 with its associated TEs, is to increase the number of calls possible simultaneously, since, in GPRS for example, only a limited number of PDP contexts can be activated for a subscriber.

FIGS. 1 and 2 also show a local administration server 5. The latter interchanges information with the TEs 1. These interchanges can be conducted via a Bluetooth type wireless connection or a wired interface between the server 5 and the MT 2 (example in FIG. 1). The MT 2 then relays the interchanges between the TEs 1 and the local administration server 5 based on the physical addresses that they contain. It should be noted that the local administration server 5 can be an integral part of the radio unit 2.

In the embodiment in FIG. 2, the administration server 5 is one of the stations of the Bluetooth technology local radio network used for the distributed terminal. In this case, the local administration server 5 has, like the other TE and MT elements, an OUI type address.

The local administration server 5 can handle a large number of supervision operations within the subsystem that it comprises with the TEs 1 and the MT 2. It can, for example, control the various TEs 1, run certain predefined maintenance tests, for example a presence test designed to ask a TE 1 to respond to a request to check its operation and that of the various interchanges involved.

It can also handle authentication of the TEs wishing to communicate with the mobile radio network 4 via the MT 2. The server 5 in practice has a list of the authorized TEs on the subsystem. If a TE 1 tries to access the network 4, it sends an access request to the MT 2 which relays it to the server 5. The latter analyzes the identifier value transmitted by the TE 1 in its access request and compares it to the list that it stores. When the identifier, which may, for example, be the physical address of the TE 1, matches an entry in the list, the local administration server 5 returns an access authorization to the TE 1 typically via the MT.

Furthermore, the local administration server 5 can authorize the encryption of the information interchanged between a TE 1 and the MT 2 independently of any encryptions applied to the interchanges between the MT 2 and the cellular network 4. The activation of encryption between a TE 1 and the MT 2 can, for example, be achieved as follows: the local administration server 5 stores an encryption key that it shares with a TE 1 and the MT 2. This key remains secret, in other words it is never transmitted explicitly over the radio. The server 5 sends to the TE 1 an activation-message containing a random number, via the MT 2. The TE 1 then returns to the server 5 an acknowledgement message which confirms that the next information interchanges with the MT 2 will be encrypted. On the MT 2 and the TE 1, a predefined algorithm taking into account the values of the secret key and of the random number received is then implemented and will be used to encrypt the future information interchanges between the MT 2 and the TE 1 concerned.

On signaling and user information interchanges, a TE 1 and the MT 2 intercommunicate directly without the mediation of the local administration server 5.

Another aspect of the invention concerns the analysis and administration of the activity of each TE 1. Measurements of the activity of each TE 1 are taken either by a single module reserved for that purpose in the MT 2, or, preferably, by a measurement module 11 present in each TE 1, as illustrated in FIG. 2. Therefore, for each TE 1, measurements are taken concerning its own activity, in other words the quantity of information that it interchanges with the MT 2 and, through it, with the network 4. For example, the measurement module 11 of a TE 1 can count the volume of data, as a number of kilobytes, sent by the network 4 to the TE. It can also count the number of requests of a predefined type originating from the TE and intended for the network 4, such as, for example, a number of "clicks" (corresponding to the sending of a URL) made by a user browsing web pages. It can even calculate the duration of a call, such as a speech call, between the TE and the network 4 without distinguishing transmission directions. Other measurements characterizing the activity of the TEs 1 can obviously be considered.

These measurements can then be subjected to an analysis and administration by the local administration server 5. The measurement modules 11 can send it a statement of the measurements taken, for example periodically, following an event (end of call for example) or even on request. The server 5 then consolidates these measurements according to predefined rules (tariff applicable according to the TEs, according to the services used, etc.), so as to produce a bill for each TE 1, which the user can pay immediately. In another advantageous embodiment, a TE 1 is equipped with a module 12 for reading a payment means, typically a prepaid card containing a credit in units. In this case, the local administration server 5 can, where appropriate via the MT 2, communicate with the TE 1 to check the usage of the TE against the remaining units of credit, the latter being decremented as the services offered are used, according to a predetermined tariff. When the credit is used up, the server 5 is notified and orders access to the network for the TE concerned to be stopped, unless the user of the TE can top up his or her credit before the service is stopped.

The invention can have a multitude of applications. It can, for example, be used to equip each bus of a tourism company with a radio unit MT with an associated subscription, and a certain number of terminal equipments TE capable of communicating with the MT and with a cellular network in accordance with the invention. A number of tourists in the bus can make speech calls, send emails, transmit virtual postcards via websites, and so on, independently of each other. Billing will, for example, be handled by the driver of the bus or even via a payment or credit card. The tariffs applied by the tourism company for the various speech or data calls can be advantageous compared to the use of a conventional multimedia terminal equipped with means of communication with the cellular network, because they can be negotiated with a mobile phone operator, for example. Another benefit of such an application is that the user of a TE has transmit and receive resources of the MT, which can be arranged to obtain a maximum gain, typically by locating the radio antennas outside the bus. This therefore provides the user with a transmission quality and therefore a service quality quite superior to that which he or she could have obtained, alone, using a simple mobile terminal inside the bus. The security of the interchanges is furthermore ensured in particular by the authentication and encryption procedures described previously.

In another application model, based on the same technical considerations, the system according to the invention including the distributed terminal 3 can be used in a mountain refuge or any other location difficult to access where a shared subscription to a cellular network is of interest.

The invention claimed is:

1. A communication system comprising a radio unit, plural terminal equipments and a local administration server, wherein the radio unit comprises:
a first communication interface with the terminal equipments, a second radiocommunication interface with a cellular network, a module for identifying a subscription to the cellular network and means for transferring multiple user streams between the cellular network and the respective terminal equipments through said radio unit and within the framework of said subscription identified by said module, and wherein the local administration server comprises means of communication with the terminal equipments, independent of the cellular network, to supervise the interchanges over the first communication interface.

2. The system as claimed in claim 1, wherein a communication between the local administration server and a terminal equipment is nude via the radio unit.

3. The system as claimed in claim 1, wherein said first communication interface is a radio interface.

4. The system as claimed in claim 1, wherein at least certain of said multiple user streams between the cellular network and the respective terminal equipments are simultaneous.

5. The system as claimed in claim 1, wherein at least certain of said multiple user streams between the cellular network and the respective terminal equipments are handled in packet mode.

6. The system as claimed in claim 1, wherein at least certain of said multiple user streams between the cellular network and the respective terminal equipments are handled in circuit mode.

7. The system as claimed in claim 1, wherein the radio unit or the terminal equipments comprise means of measuring an activity relating to the interchanges over the first communication interface.

8. The system as claimed in claim 7, wherein the means of communication between the local administration server and the terminal equipments comprise means of providing a billing based on said activity measurement relating to the interchanges over the first communication interface.

9. The system as claimed in claim 8, wherein the terminal equipments comprise means of reading a payment means, information relating to the reading of the payment means being transmitted to the local administration server, and wherein said billing takes into account said information relating to the reading of the payment means.

10. The system as claimed in claim 1, wherein the means of communication between the local administration server and the terminal equipments comprise means of authenticating said terminal equipments.

11. The system as claimed in claim 1, wherein the means of communication between the local administration server and the terminal equipments comprise means of activating an encryption on said first communication interface.

12. The system as claimed in claim 1, wherein the radio unit comprises means of controlling said multiple user streams between the cellular network and the respective terminal equipments connected to the first interface.

13. The system as claimed in claim 12, wherein said means of controlling the multiple user streams comprise at least one of the following elements: means of scheduling the setting up of said streams, means of managing priorities between the streams, means of managing queuing for setting up said streams and means of managing service quality.

14. A supervision method in a communication system comprising a radio unit, plural terminal equipments and a local administration server, the radio unit. comprising a first communication interface with the terminal equipments, a second radiocommunication interface with a cellular network, the method comprising:
identifying, by a module in the radio unit, a subscription to the cellular network;
transferring multiple user streams between the cellular network and the respective terminal equipments through said radio unit and within the framework of said subscription identified by said module; and
the local administration server communicating with the terminal equipments, independently of the cellular network, to supervise the interchanges over the first communication interface.

15. The method as claimed in claim 14, wherein the communication between the local administration server and a terminal equipment is made via the radio unit.

16. The method as claimed in claim 14, wherein said first communication interface is a radio interface.

17. The method as claimed in claim 14, wherein at least certain of said multiple user streams between the cellular network and the respective terminal equipments are simultaneous.

18. The method as claimed in claim 14, wherein at least certain of said multiple user streams between the cellular network and the respective terminal equipments are made in packet mode.

19. The method as claimed in claim 14, wherein at least certain of said multiple user streams between the cellular network and the respective terminal equipments are made in circuit mode.

20. The method as claimed in claim 14, further comprising making a measurement of an activity relating to the interchanges over the first communication interface by the radio unit or by the terminal equipments.

21. The method as claimed in claim 20, further comprising producing a bill based on said measurement of activity relating to the interchanges over the first communication interface.

22. The method as claimed in claim 21, wherein the terminal equipments include means of reading a payment means, the method further comprising transmitting information relating to the reading of the payment means to the local administration server, and wherein said billing takes into account said information relating to the reading of the payment means.

23. The method as claimed in claim 14, wherein the communicating between the local administration server and the terminal equipments includes authenticating said terminal equipments.

24. The method as claimed in claim 14, wherein the communicating between the local administration server and the terminal equipments includes activating an encryption on said first communication interface.

25. The method as claimed in claim 14, further comprising controlling said multiple user streams between the cellular network and the respective terminal equipments connected to the first interface by the radio unit.

26. The method as claimed in claim 25, wherein controlling the multiple user streams includes at least one of the following: scheduling of setting up said streams, managing priorities between the streams, and performing queuing for setting up said streams, and managing service quality.

27. The system as claimed in claim 1, wherein the radio unit comprises a mobile termination.

28. The system as claimed in claim 1, wherein the radio unit includes plural different types of interfaces to communicate with different terminal equipments.

29. A radio unit, comprising:
- a first communication interface to communicate with plural terminal equipments;
- a second radio communication interface to communicate with a cellular network;
- a subscriber identification module to identify a subscription to the cellular network; and
- a control module for transferring multiple user streams between the cellular network and the respective terminal equipments through the radio unit within a framework of the subscription identified by the subscriber identification module.

30. The radio unit of claim 29, wherein the multiple user streams comprise multiple packet data protocol (PDP) contexts.

31. The radio unit of claim 30, wherein the control module is configured to schedule setup of the PDP contexts.

32. The radio unit of claim 29, further comprising a measurement module to measure activity of the terminal equipments to enable billing for the activities.

33. An apparatus comprising:
- a radio unit having:
  - a first communication interface to communicate with plural terminal equipments;
  - a second radio communication interface to communicate with a cellular network;
  - a subscriber identification module to identify a subscription to the cellular network;
  - a control module for transferring multiple user streams between the cellular network and the respective terminal equipments through the radio unit within a framework of the subscription identified by the subscriber identification module; and
- a local administration server having an interface to communicate with the terminal equipments, independent of the cellular network, to supervise the interchanges over the first communication interface of the radio unit.

34. The apparatus of claim 33, wherein the multiple user streams comprise multiple packet data protocol (PDP) contexts.

35. The apparatus of claim 34, wherein the control module is configured to schedule setup of the PDP contexts.

36. The apparatus of claim 33, wherein the radio unit further comprises a measurement module to measure activity of the terminal equipments to enable billing for the activities.

37. The apparatus of claim 33, wherein said first communication interface is a radio interface.

\* \* \* \* \*

UNITED STATES PATENT AND TRADEMARK OFFICE
CERTIFICATE OF CORRECTION

PATENT NO. : 7,433,675 B2  Page 1 of 1
APPLICATION NO. : 10/509397
DATED : October 7, 2008
INVENTOR(S) : Thierry Lucidarme et al.

It is certified that error appears in the above-identified patent and that said Letters Patent is hereby corrected as shown below:

Column 9:
Line 19, "nude" should be --made--.

Signed and Sealed this

Second Day of December, 2008

JON W. DUDAS
*Director of the United States Patent and Trademark Office*